INVENTORS
Vincent W. Martin
Henry A. Lyczak
BY Le Blanc & Shur
ATTORNEYS

May 27, 1969 V. W. MARTIN ET AL 3,447,052
OSCILLATING MOTOR DRIVE SYSTEM
Filed Oct. 12, 1965 Sheet 2 of 4

INVENTORS
Vincent W. Martin
Henry A. Lyczak
BY
Le Blanc & Shur
ATTORNEYS

May 27, 1969

V. W. MARTIN ET AL 3,447,052

OSCILLATING MOTOR DRIVE SYSTEM

Filed Oct. 12, 1965

INVENTORS
Vincent W. Martin
Henry A. Lyczak

BY Le Blanc & Shur

ATTORNEYS

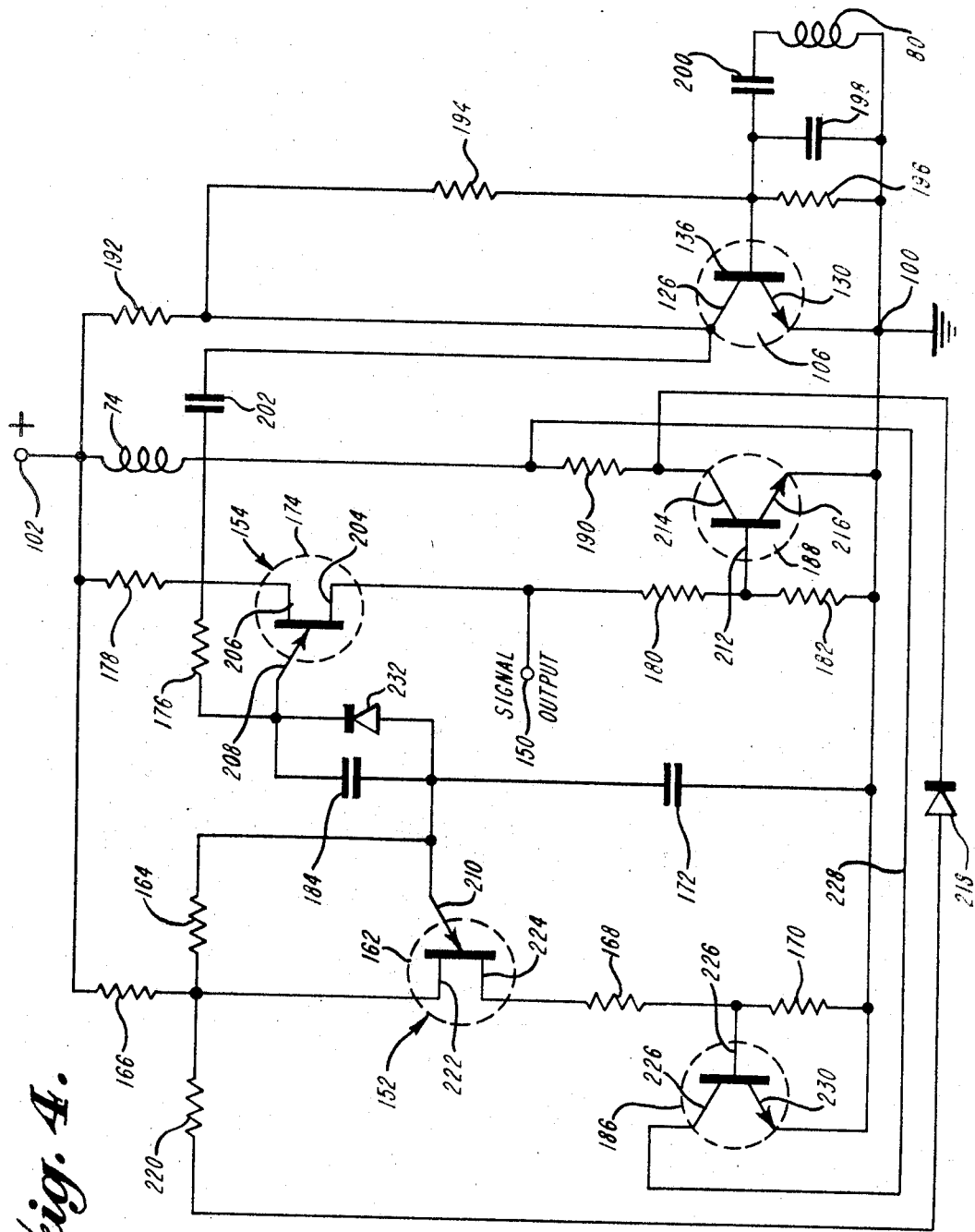

United States Patent Office 3,447,052
Patented May 27, 1969

3,447,052
OSCILLATING MOTOR DRIVE SYSTEM
Vincent W. Martin, Lancaster, Pa., and Henry A. Lyczak, Riverside, N.J., assignors to Hamilton Watch Company, Lancaster, Pa., a corporation of Pennsylvania
Filed Oct. 12, 1965, Ser. No. 495,080
Int. Cl. H02p *3/02, 5/06, 7/06*
U.S. Cl. 318—128                            17 Claims

ABSTRACT OF THE DISCLOSURE

Disclosed is a relaxation oscillator pulse generator useful as a low frequency pulse timer or as a self-starting drive for timepieces. The system includes a mechanical oscillator coupled to a pair of self-starting electrical oscillators, each having a natural period of oscillation more than twice that of the mechanical oscillator. One of the electrical oscillators provides rapid start-up of the system and the other takes over control after starting. The overall system operates at the rate of and with the stability of the mechanical oscillator.

---

This invention relates to relaxation-oscillator-type pulse generators and more particularly to self-synchronized oscillators useful as pulse timers for producing a low-frequency output having an accurate repetition rate. Alternatively, the device of the present invention may be utilized as a self-starting electro-magnetic drive arrangement for watches, clocks and similar timing mechanisms.

Various arrangements are known for mechanically controlling the output of an oscillator. These very often take the form of a mechanical oscillatory system connected between the input and output circuits of an amplifier or switching transistor or the like. The reason for these arrangements is that, as is well known, the accuracy of an electronic oscillator, particularly at relatively low frequencies, varies substantially with both temperature and power-supply voltage changes. For this reason, it has been proposed in the past to control the output of such an oscillator through the use of a separate oscillatory system of a mechanical or electromechanical watch or clock mechanism. The mechanical oscillator is not so susceptible to fluctuations in output and the overall accuracy of the oscillator, being substantially that of the mechanical movement, is significantly increased.

The serious disadvtange of prior constructions, particularly those involving horological mechanical movements, is the fact that, in general, no simple and effective self-starting arrangement has been provided. In addition to providing self-starting features, the electronic oscillator circuit of the present invention may be used as a fairly accurate secondary pulse source in the event of a failure in the mechanical system.

These and further problems were substantially overcome by the novel device shown and described in assignee's copending application Ser. No. 246,897, filed Dec. 26, 1962, in the name of Richard S. Walton. In that application there is disclosed an electrical pulse timer having the accuracy of a mechanical movement which further incorporates a simple and reliable self-starting feature in the form of an electronic circuit. The electronic oscillator circuit is used in that device for starting and as a fairly accurate secondary pulse source in the event of a failure in the mechanical system.

The device of that application, if provided with an electrical output, may be used as a pulse timer to provide accurately spaced, low repetition rate pulses for use as a low-frequency time base, particularly in the frequency range of about 1 to 20 cycles per second. Alternatively, the device may be incorporated in an electric watch or a clock so as to act as a power source for the horological device to drive the watch or clock hands in a conventional manner.

Oscillators of the type disclosed in assignee's aforementioned copending application have proved quite satisfactory and are rapidly gaining commercial acceptance as reliable and accurate low-frequency oscillators and pulse generators. The present invention provides a mechanically self-synchronized relaxation oscillator which provides regularly repeated timing pulses of a preset rate. This mechanical synchronization makes possible a higher degree of accuracy in the spacing of the output pulses over long periods of time as well as over a wide temperature range. The output of the generator of the present invention may be coupled to an electrical or mechanical circuit and may be made to perform in any instance where a small, lightweight, accurate, low-frequency time base is required.

It is therefore one object of the present invention to provide a semiconductor relaxation oscillator with means for controlling the pulse frequency very accurately.

Another object of the present invention is to provide a semiconductor relaxation oscillator whose output exhibits good stability over a wide range of power supply voltage and environmental variations.

Another object of the present invention is to provide a relaxation oscillator which becomes mechanically synchronized automatically.

Another object of the present invention is to provide a relaxation oscillator and coupled controlling unit such that the entire package is of extremely small physical size and light weight.

Another object of the present invention is to provide a self-synchronized relaxation oscillator having a rapid start-up time and increased accuracy of oscillation.

Another object of the present invention is to provide a relaxation oscillator incorporating an electronic unit including a unijunction transistor. The relaxation oscillator is self-synchronized through the provision of a mechanical unit having an oscillating balance much in the manner of an electric clock or watch. The natural period of oscillation of the electronic oscillator is chosen to be greater than the period of the mechanical oscillator, so that the two automatically become synchronized and the device operates at the rate of and with the stability of the mechanical unit. In the preferred form of the invention, greater forces are applied to the mechanical system during start-up and also in response to variations in environmental conditions which would otherwise tend to affect the accuracy of the system. Thus, the sustaining forces of the mechanical system are automatically adjusted through the use of a novel automatic internal electronic switching arrangement.

Another object of the present invention is to provide a mechanically synchronized electronic oscillator wherein the mechanical portion of the assembly is provided with an improved magnetic circuit. A plurality of permanent magnets, including at least one drive magnet and one trigger magnet, are mounted on and carried by an oscillatory balance wheel. Novel shielding and shunt arrangements are provided to optimize the effect of the magnetic field on the drive and trigger coils located adjacent the path of movement of the oscillatory balance system but at the same time minimize the deleterious effects of the magnetic fields on adjacent magnetic or magnetizable materials of the movement.

These and further objects and advantages of the invention will be more apparent upon reference to the following specification, claims and appended drawings wherein:

FIGURE 4 is a circuit diagram of a preferred embodiment of a pulse timer or watch drive constructed in accordance with the present invention;

For purposes of this disclosure, a "relaxation oscillator circuit" is herein defined as an oscillator whose frequency of oscillations is determined by the time of charging a capacitor through a resistor. When used to provide timing pulses, such a circuit provides one pulse for every cycle of its operation. "Pulse repetition" is herein defined as the time required to complete one cycle.

Figure 1:
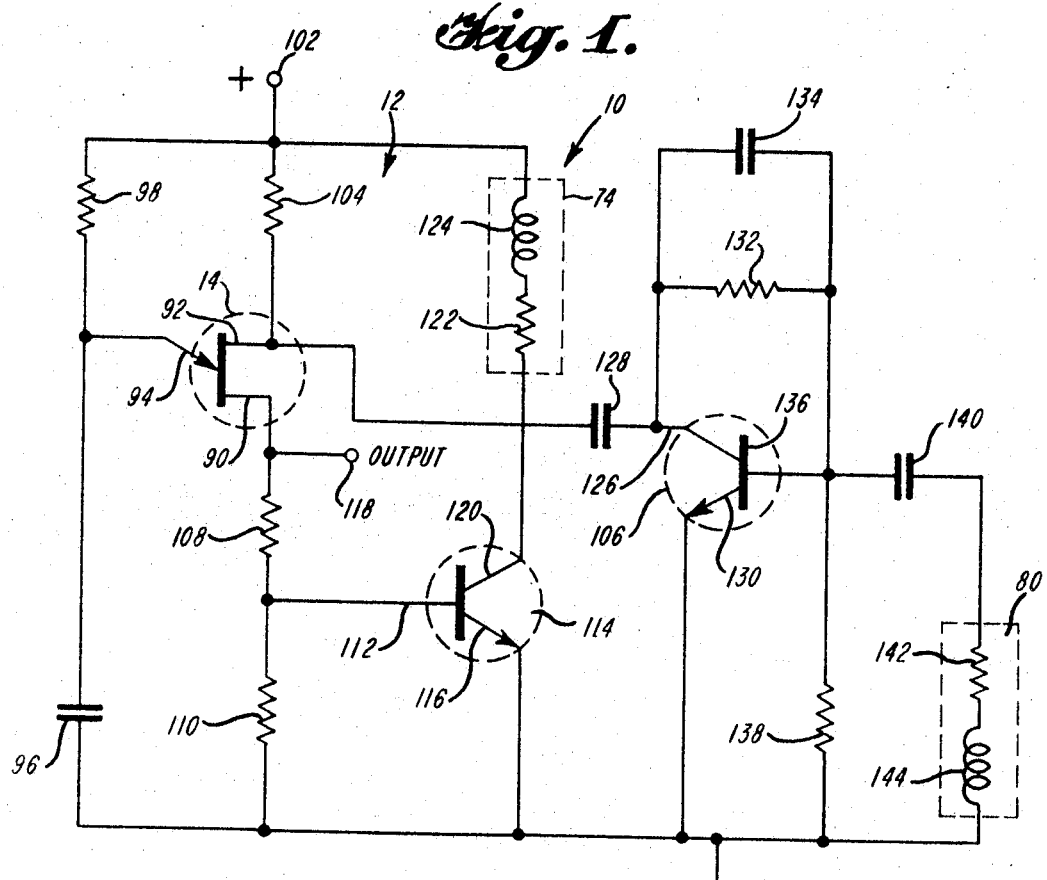
FIGURE 1 is a circuit diagram of a pulse timer or watch drive constructed in accordance with the present invention.
Figure 2:
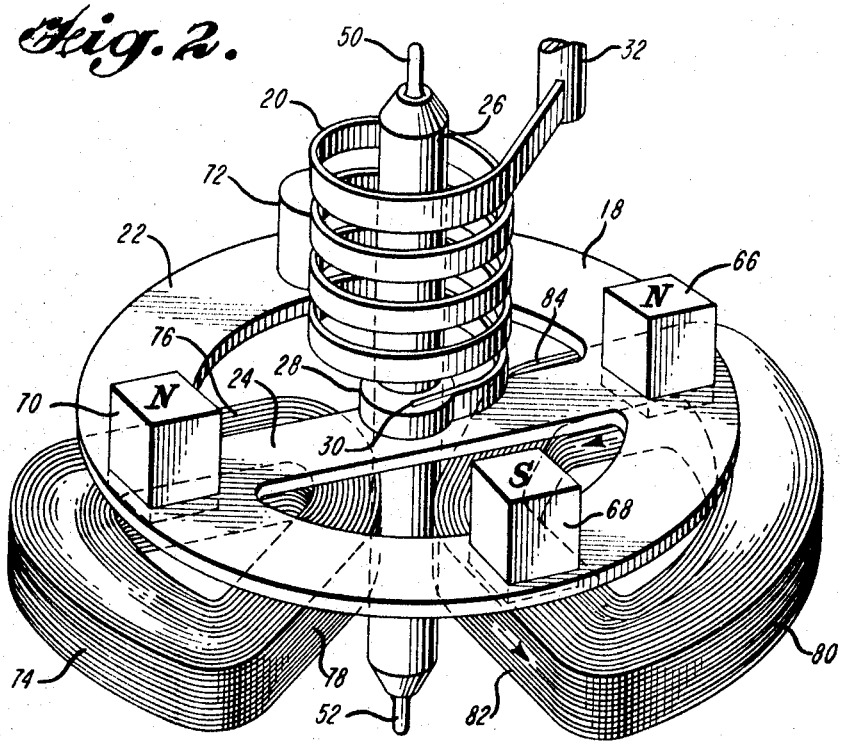
FIGURE 2 is a perspective view with parts broken away and parts in section showing the basic elements of the mechanical unit.
Figure 3:
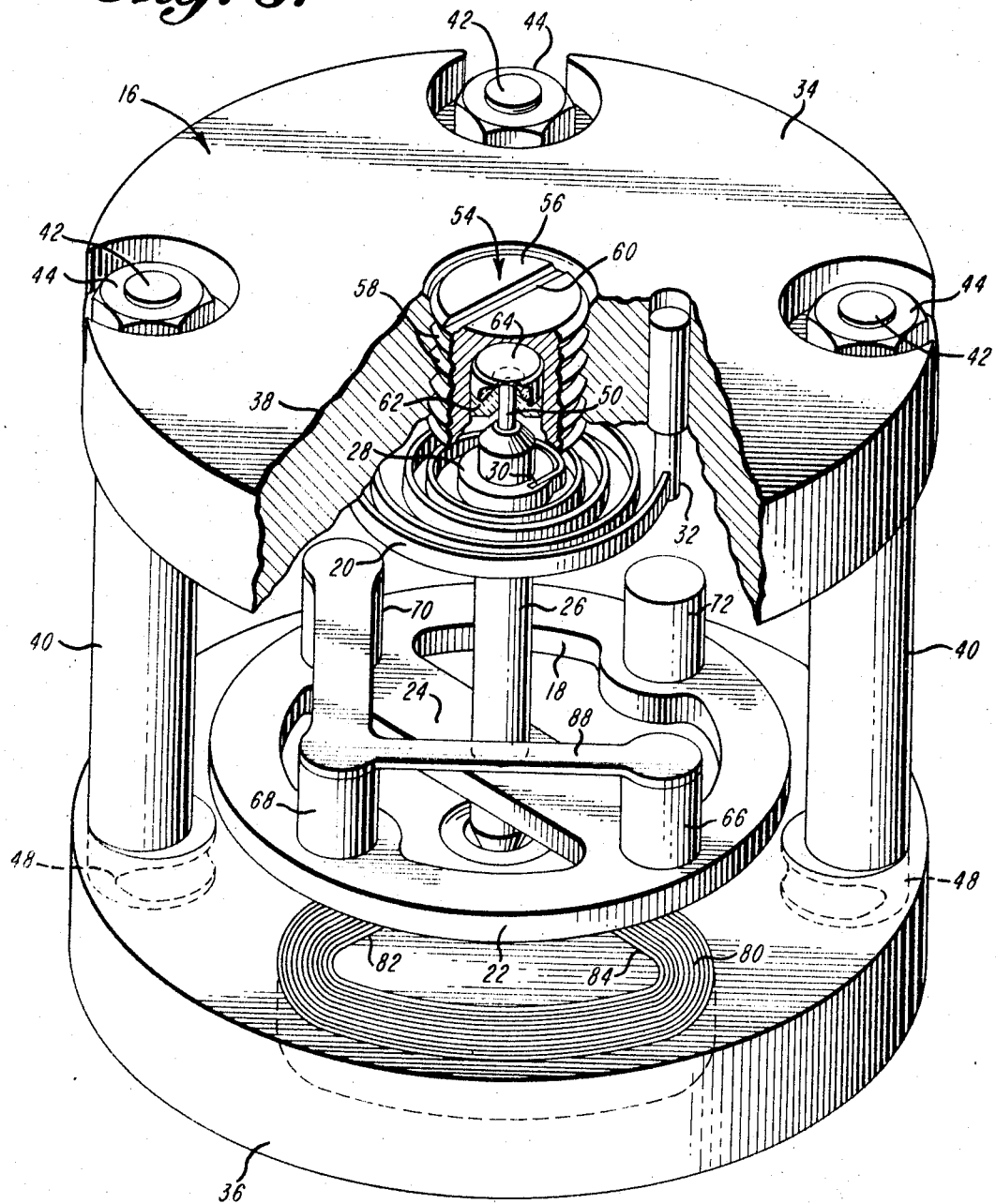
FIGURE 3 is a perspective view with parts broken away and parts in section showing the fully assembled mechanical unit constructed in accordance with the present invention.

Referring to the drawings and particularly to FIGURES 1–3, there is shown a relaxation oscillator circuit particularly suited to operate in the low-frequency range, particularly in the frequency range of about 1 to 20 cycles per second such that the oscillator pulse repetition period may correspondingly vary from ½₀ to 1 cycle per second. More particularly, the relaxation oscillator circuit of FIGURE 1 is of the self-synchronized type such that the pulse repetition period of the oscillator during normal operation is controlled by a mechanical delay or oscillatory system rather than the charging time of the capacitor. However, the electronic portion of the circuit does operate through a charging RC time constant to provide for self starting and to assure a secondary oscillator pulse source in the event of failure of the mechanical system.

Referring specifically to FIGURES 1–3, the pulse generator of the present invention, generally indicated at 10, comprises an electronic relaxation oscillator 12 including a unijunction transistor 14, as illustrated in FIGURE 1, and a mechanical system 16, illustrated in FIGURE 2, including oscillatory balance wheel 18 governed in a more or less conventional manner by a coiled hairspring 20.

Referring more particularly to FIGURES 2 and 3, the balance wheel 18 comprises an annular rim or ring 22, the opposite sides of which are connected by a central crosspiece or cross-arm 24. This crosspiece is centrally apertured to receive for rotation therewith a balance staff 26. A collar 28 may be mounted on the balance staff, as illustrated in FIGURE 2, adjacent its center or near one end, as in FIGURE 3. This collar 28 receives one end 30 of hairspring 20, the other end of the hairspring being secured to stationary pin 32.

As best seen in FIGURE 3, the entire mechanical assembly 16 is mounted between a pair of circular plates 34 and 36, the former being broken away at 38 to illustrate interior portions of the assembly. Plates 34 and 36 are separated by a plurality—i.e., three—of hollow posts 40 receiving elongated screws 42 and nuts 44. The nuts 44 are located in suitable cavities 46 in the upper plate 34. In this way the plates 34 are accurately spaced by the posts 40 but are secured together by the screws 42 having heads, indicated by dashed lines at 48, received in similar cavities in lower plate 36 and clamped at their other ends to the upper plate 34 by the nuts 44.

The opposite ends of balance staff 26 are tapered, as at 50 and 52, for reception in end shake bearings, one in each of the respective plates—that formed in plate 34 being illustrated at 54 in FIGURE 3. The bearing assembly includes a mounting case 56 threaded into plate 34, as at 58, and provided with a slot 60 at one end for reception of a screwdriver or other appropriate tool. Bearing case 56 rigidly mounts a pair of bearing jewels 62 and 64 receiving the tapered end 50 of balance staff 26. The other end 52 of the balance staff is received in a similar end shake bearing assembly in lower circular mounting plate 36.

Mounted in the rim 22 of balance wheel 18 are three permanent magnets 66, 68 and 70, which may be of cubic shape having a rectangular cross section, as illustrated in FIGURE 2, or, alternatively, may be of cylindrical shape having a circular cross section, as illustrated in FIGURE 3. These permanent magnets are preferably all of similar size and construction and are received through suitable apertures in the balance rim such that the lower end is substantially coextensive with or projects slightly below the underside of the balance rim. The permanent magnets may be secured to the balance rim by means of suitable adhesive such as epoxy or the like. They are polarized in directions parallel with the rotational axis of the balance staff 26 and by way of example only, permanent magnets 66 and 70 are illustrated as having upper north poles (and corresponding south poles at their lower ends), while magnet 68 is illustrated as polarized with a south pole at its upper end (and a corresponding north pole at its lower end). The polarities of the magnets are not critical and may be varied in accordance with the desired direction of force impulses applied to the balance wheel and in accordance with the particular winding direction of the drive and trigger coils employed in the unit. A counterweight 72 is similarly mounted on the balance wheel rim 22 on the side opposite from magnet 68, so as to counterbalance the weight of this magnet. The weight of magnets 66 and 70 counterbalance each other about the rotational axis of the balance staff.

In the arrangement shown, there are provided two coils—namely, a drive coil 74 of generally pie- or sector-shaped construction having a plurality of turns defining substantially radially extending arms 76 and 78, and a generally similar trigger coil 80 of generally pie or sector shape but preferably somewhat larger than the drive coil 74 and including numerous turns defining spaced radial arms 82 and 84. These latter arms are illustrated as underlying the adjacent poles of the respective magnets 66 and 68. Magnet 70 is, on the other hand, adapted to cooperate with one of the radial arms 76 or 78 of drive coil 74, depending upon the impulse direction of the balance wheel, the coil winding direction, and the polarity of the magnet 70, which may be suitably chosen in accordance with the following mode of operation. Finally, the magnets may be provided with an angular keeper or shunt 88, as illustrated in FIGURE 3, so as to confine and direct the flux from the upper poles of each of the permanent magnets 66, 68 and 70.

Referring to FIGURE 1, as previously described the device of the present invention incorporates a unijunction transistor (UJT), relaxation oscillator. The principle of operation of a unijunction oscillator circuit is well known. The UJT has three terminals—two ohmic bases (designated Base 1 and Base 2) and one emitter connected to one of these bases by an internal diode. The UJT fires when the ratio of the voltage between Base 1 and Base 2 and the voltage between Base 1 and the emitter reaches a certain predetermined value. To further explain the word "fire" as used in the preceding sentence, the UJT exhibits a high impedance between Base 1 and Base 2 before the previously mentioned voltage ratio is reached. When this pretermined voltage ratio is reached, this impedance drops. Also, the internal diode of the UJT becomes biased so as to cause it to conduct a current between the emitter and Base 1.

The basic relaxation oscillator 12 used in the present invention consists of the unijunction transistor device 14 consisting of two ohmic bases—Base 1 being labeled "90" and Base 2 being labeled "92"—and an emitter 94 connected to base 90 by an internal diode. This UJT 14 is so connected in the circuit that the base 92 is at a higher potential than base 90. The basic period of this oscillator is determined by a capacitor 96 and a charging resistor 98. The capacitor 96 is connected between the UJT emitter 94 and the negative terminal 100 of a suitable power supply. The charging resistor 98 is connected between the positive terminal 102 of the power supply and the UJT emitter 94.

A resistor 104 is provided to properly bias the UJT base 92 and a further amplifying transistor 106, as more fully described below.

The resistor combination of resistors 108 and 110 provide proper bias for the UJT base 90. The voltage divider action of resistors 108 and 110 also provide bias for the base 112 of a switching transistor 114.

The combination of the UJT emitter 94 to base 90 resistance, the resistors 108 and 110, and the base 112 to emitter 116 resistance of a switching transistor 114 determines the output pulse height and duration derived at output terminal 118.

The switching transistor 114 is of conventional construction of the type that the impedance state between the collector 120 and the emitter 116 is either a short circuit or an essentially open circuit. This is controlled by the magnitude of the current between the base 112 and the emitter 116. The resistor 110 is connected between the switching transistor base 112 and the negative supply voltage terminal 100 to provide the necessary bias to effect the switching operation. Upon switching, a very low impedance connects the resistor 122-inductor 124 combination from the positive power supply terminal 102 to the negative power supply terminal 100. Thus the total supply voltage is effectively across this resistor 122 and inductor 124 combination.

Resistor 122 and inductor 124 are the internal parameters of the drive coil 74 shown in FIGURES 2 and 3. The resistor 122 is the internal copper resistance of this coil and limits the current flow through the drive coil 74 when the switching transistor collector 122-emitter 116 impedance is in its low state. The inductor 124 of the drive coil 74 represents the inductance of the coil of insulated copper wire denoted as the drive coil 74. This inductance 124 and the resistance 122 control the magnetic energy output of the drive coil 74.

In a preceding paragraph, amplifying transistor 106 was mentioned. The collector 126 of this transistor is coupled to the UJT base 92 by a coupling capacitor 128. The leakage resistance of this capacitor 128 also provides bias for the amplifying transistor 106. The amplifying transistor emitter 130 is connected to the negative supply potential terminal 100.

The parallel resistor 132 and capacitor 134 combination connected between the amplifying transistor collector 126 and base 136 constitutes a negative feedback network which operates in a conventional manner to improve the linearity of the amplifier action of transistor 106. This transistor acts both as an amplifier and as an inverter to apply a negative pulse to the base 92 contact of the UJT.

The voltage divider action of resistor 132 in conjunction with resistor 138 provides bias for the amplifier base 136, the resistor 138 being connected between the base 136 and the negative supply terminal 100.

A further capacitor 140 is used to isolate and couple the trigger coil 80 into the circuit. Resistor 142 and inductor 144 are the internal components of the insulated copper wire wound trigger coil 80.

Operation of the pulse generator 10 begins with the connecting of terminals 100 and 102 to the positive and negative sides of a suitable power supply, such as a battery or the like (not shown). Immediately upon the connection of these two terminals, resistor 98 conducts a charging current to capacitor 96. The voltage across capacitor 96 rises in accordance with the time constant of the resistor 98-capacitor 96 combination.

With the connection of terminals 100 and 102 to a voltage supply, a DC potential is set up at the UJT base 90 and base 92. Due to the connections shown, base 92 is positive with respect to base 90. When the capacitor 96 has charged to a predetermined voltage value, the UJT 14 fires, as explained in earlier paragraphs. At this time a low impedance is presented to the charged capacitor 96. This in turn causes a discharging current from the capacitor to flow into this low impedance.

Before the firing of the UJT 14, UJT base 90 is essentially at the potential of the negative terminal 100 of the power supply. The capacitor 96 discharging current flows through the UJT base 90 and through the resistors 108 and 110. This causes a rise in the potential of the UJT base 112 and a positive pulse to appear at output terminal 118.

Before the firing of the UJT 14, the switching transistor base 112 was at the negative voltage supply potential of terminal 100. After firing, the voltage divider action of the resistors 108 and 110 causes the switching transistor base 112 to rise to a preset fraction of the UJT base 90 voltage. This rise in switching transistor base 112 voltage provides the bias to the switching transistor 114, so as to cause it to switch from a high impedance between switching transistor collector 120 and emitter 116 to a low impedance. This low impedance in the drive coil circuit allows current to flow through the drive coil 74. This current in turn is changed to magnetic energy by this coil.

When the capacitor 96 has discharged to a predetermined voltage, the UJT 14 ceases to conduct, the UJT base 90 voltage returns to a low value, the switching transistor base 112 drops also to a low value and switching transistor 114 returns to the high-impedance state between its collector 120 and emitter 116. Thus the drive coil 74 ceases to conduct and the current pulse ends.

When the drive coil 74 is conducting, the magnetic flux of the coil 74 interacts with the flux of the permanent magnet 70 of FIGURES 1 and 2. The polarity and position of the permanent magnet 70 in the balance wheel rim 22 is such that initial motion of the balance wheel 18 results from this interaction.

With the moving of the balance wheel out of the rest position illustrated, energy is stored in the hairspring 20. The kinetic energy imparted to the balance wheel 18 by the drive coil 74 is completely converted into potential energy in the hairspring 20. When this kinetic energy is expanded, the balance wheel stops and reverses direction. It continues to the far end of its travel in this new direction, again storing potential energy in the hairspring 20. Finally, the balance wheel 18 begins its travel in the original direction. Near the point of maximum velocity of the balance wheel 18 (which point is illustrated in FIGURES 2 and 3), the two other permanent magnets 66 and 68 pass across the radial turns 84 and 82, respectively, of trigger coil 80. This induces a current pulse in the trigger coil. Since the magnets 66 and 68 are of opposite polarity, the induced currents in the trigger coil 80 reinforce in the manner illustrated by the arrows in FIGURE 2 through the respective arms 82 and 84. At this instant, the drive magnet 70 is at or near its original rest position with respect to the drive coil 74.

The current pulse from the trigger coil 80 is converted to a voltage pulse by the internal resistance 142 of the trigger coil 80. This voltage pulse is passed to the amplifying transistor base 136 to be amplified and inverted. It emerges as a negative pulse between the amplifying transistor collector 126 and emitter 130. It is then passed through coupling capacitor 128 to UJT base 92.

During this time, capacitor 96 has been charging. The lowering of the UJT base 92 voltage causes the firing of the UJT, again energizing the drive coil 74, as previously described. At that instant of the trigger pulse, the permanent magnet 70 is in such a position with respect to the drive coil 74 that they again interact, giving energy to the balance wheel 18. These cycles repeat themselves as long as the potential is applied between terminals 100 and 102, as previously described.

The output pulses are taken at the UJT base 90 by way of output terminal 118. To insure complete control by the mechanical assembly, the natural period of the electronic relaxation oscillator is preset to be slightly higher than the natural period of the balance wheel 18. The self-starting is due primarily to the fact that the relaxation oscillator will oscillate without any motion of the balance wheel 18.

In the circuit of FIGURE 1, the provision of a switching transistor such as transistor 114 makes it possible to apply almost the full voltage of the power supply to the drive coil 74 each time the unijunction transistor fires. Almost (but not quite) a complete cycle later of the natural period of the electronic oscillator, a pulse is induced on the trigger coil 80 and is amplified in transistor 106 and applied as a trigger impluse to the unijunction transistor 14. Amplifier 106 also acts as an inverter in that a positive pulse initially applied to the mechanical system is later detected at its input (trigger coil 80) and supplied as a negative pulse to fire unijunction transistor 14.

As will be apparent in the operation of the circuit of FIGURE 1, start-up energy is supplied to the mechanical system during the first cycles of operation and the magnitude of the balance wheel oscillations increases until such time as the energy supplied to the system from the battery is equal to the losses in the system occurring from mechanical and electrical resistances, windage and the like. While it is desirable that substantial energy be supplied to the drive coil to insure fairly rapid start-up of the mechanical oscillatory system, the energy supplied to the unit should not be so great as to seriously tend to overdrive the mechanical system during normal operation. Preferably the unit of FIGURE 1 and its parameters should be constructed so that the system synchronizes at an energy level such that the balance wheel undergoes an approximately 270° revolution during a complete cycle of oscillation.

In certain applications where rapid start-up is highly desirable and more accurate synchronous operation required, the requirement that more energy be used to originally start the unit than to keep the unit operating, presents a problem. In these cases, if the same energy used for rapid starting is applied to the unit during synchronized operation, the mechanical motion rises unduly, tending to over drive the mechanical system, causing inaccurate oscillating periods. A mechanical arrangement for limiting the motion of the balance wheel to a usable range can be provided. However, this involves some loss of synchronism of the balance wheel and affects the overall accuracy of the pulse repetition rate at the output. FIGURE 4 describes an improved and preferred circuit arrangement for avoiding this problem, incorporating an electronic switching circuit which fulfills the same purpose as a mechanical motion limiter without at the same time intaroducing error into the mechanical oscillator. In FIGURE 4, like parts bear like reference numerals.

The basic arrangement of FIGURE 4, as before, provides an initial pulse from a unijunction transistor (UJT) relaxation oscillator. The voltage of this pulse is the full input voltage from the power supply to the unit This provides the initial or start-up motion to the mechanical system. Again, a signal is taken from the oscillating mechanical system and used to control the period of the electronic oscillator. However, as distinguished from the circuit of FIGURE 1, the arrangement of FIGURE 4 provides a reduced drive pulse when both the mechanical and electrical systems are synchronized. This reduced voltage pulse is used for continued synchornized operation.

The arrangement illustrated in FIGURE 4 is more simply presented in block-diagram form in FIGURE 5, and again provides an arrangement for producing a very accurately spaced series of output pulses at the output terminal 150 of FIGURE 4 and 5. The circuit consists essentially of a start oscillator 152 of the unijunction-relaxation type, a similiar unijunction control oscillator 154, a mechanical unit which may be of the type illustrated in FIGURES 2 and 3 or preferably of the type illustrated in FIGURE 6 by the reference numeral 158, and finally an amplifier 160. The start oscillator is a basic UJT relaxation oscillator consisting of unijunction transistor 162, resistors 164, 166, 168 and 170, and capacitor 172. The control oscillator, also a UJT relaxation oscillator, consists of unijunction transistor 174, resistors 176, 178, 180 and 182, and capacitors 172 and 184.

The power switching system 156 can be separated into two individual switches—the starting switch and the running switch. The starting switch consists of transistor 186, resistors 168 and 170, and drive coil 74. The running switch consists of transistor 188, resistors 180, 182 and 190, and also drive coil 74. The mechanical system as illustrated in FIGURE 6 again consists of the drive coil 74, trigger coil 80, drive magnet 70, trigger magnets 66 and 68, balance staff 26, counterweight 72, and a modified balance wheel 190. The amplifier unit in FIGURE 4 again consists of transistor 106, resistors 192, 194 and 196, capacitors 198 and 200, and trigger coil 80. Capacitor 202 is a coupling capacitor from the amplifier output to the control oscillator UJT 174.

The unijunction transistor 174 in a conventional manner consists of two ohmic bases—Base 1 being labeled "204" and Base 2 being labeled "206"—and an emitter 208 connected to base 204 by an internal diode. UJT 174 is so connected in the circuit that base 206 is at a higher potential than base 204 and the potential of the emitter 208 is dependent on the charge of the capacitors 172 and 184. The time rate of charging of these capacitors determines the pulse period of the individual UJT 174. In accordance with standard UJT theory, when the ratio of base 206–base 204 voltage to base 204-emitter 208 voltage reaches a predetermined value, the internal diode between the emitter 208 and base 204 becomes forward biased and conducts an electric current. This is supplied mostly by the charge on capacitors 172 and 184. The current flow is from the capacitors through the UJT emitter 208, the UJT base 204 and the external base resistors 180 and 182 to the negative terminal of the power supply 100. In this embodiment, the negative terminal of the power supply is illustrated as grounded. This action will be further referred to as "firing" the UJT. This firing causes the capacitors 172 and 184 to discharge to a predetermined level. Upon reaching this level, the emitter 208 to base 204 internal diode becomes reverse biased and the UJT 174 returns to its original state. The charging of the capacitors begins and the cycle is repeated. The time between two successive firings of UJT 174 is the natural period of the UJT relaxation oscillator, i.e., the control oscillator 154 of FIGURE 5.

When the proper voltage source (not shown) is applied to the circuit plus terminal 102 and minus (grounded) terminal 100, the timing capacitors 172 and 184 begin charging through the appropriate resistors. The circuitry is so designed that UJT 174 has a natural period less than the natural period of UJT 162. Thus UJT 174 fires before UJT 162. However, since the firing of UJT 174 discharges both capacitors 172 and 184, the emitter 210 voltage of UJT 162 is decreased when UJT 174 fires. Thus UJT 162 does not fire on its natural period. When UJT 174 fires, the current flowing through resistors 180 and 182 raises the voltage at the base 212 of switching transistor 188. Prior to this voltage rise, transistor 188 was in its cut-off state. That is, the characteristics between the collector 214 and emitter 216 are then represented by essentially an open circuit. Only a small amount of leakage current flows between these two points. The raising of the base 212 voltage causes the collector 214 to emitter 216 open-circuit condition to switch to a saturated or essentially short-circuit condition. This condition completes the connection from resistor 190 to the negative supply terminal 100. Thus current flows through the drive coil 74 and resistor 190, thereby exciting the coil to produce a magnetic pulse. This magnetic pulse interacts with the magnet 70 on the balance wheel 190 of FIGURE 6. This pulse is not of sufficient strength itself to start the mechanical unit.

When the switching transistor 188 is in the cut-off state, diode 218 is reverse-biased and does not conduct. However, when transistor 188 becomes saturated, diode 218 becomes forward-biased and current flows through resistors 166, 220, diode 218, collector 214 and emitter 216 to the negative supply terminal 100. This current flow causes a reduction in the voltage at Base 2, labeled "222," of unijunction transistor 162. This negative voltage pulse occurs at base 222 of UJT 162 only a fraction of a second after the initial firing of UJT 174. Therefore, capacitor 172 has not had time to discharge to any extent. According to UJT control theory, firing of the UJT 162 is forced ahead of its natural period by the reduction of the base 222 voltage. With the associated circuitry properly chosen, conditions are such that the negative pulse applied to base 222 of UJT 162 causes UJT 162 to fire. Capacitor 172 is discharged through UJT 162, emitter 210, Base 1 (labeled "224"), and resistors 168 and 170 to negative or ground terminal 100.

Prior to the firing of UJT 162, switching transistor 186 was in the cut-off state. After UJT 162 fires, transistor 186 is driven into saturation, as previously described for the other switching transistor 188. The collector 226 of transistor 186 is connected directly to one side of the drive coil 74 by way of lead 228. The drive coil 74 is thus placed directly between the plus supply terminal 102 and the minus supply terminal 100 through the saturated collector 226 to emitter 230 circuit of switching transistor 186. This full supply voltage generates a magnetic pulse of greater energy in the drive coil 74 than the pulse generated through transistor 188 alone. This increased energy, when interacting with a magnet such as 70 in the balance wheel, is sufficient to impart substantial starting energy to the balance wheel. The entire process from the initial firing of UJT 174 to the actual application of full supply potential across drive coil 74 occurs in approximately two microseconds. This energy pulse is the actual starting pulse of the system.

When UJT 162 is first fired, UJT 174 is still in its conducting state. However, the firing of UJT 162 acts to discharge capacitor 172, reducing the voltage across capacitor 172 and therefore reducing also the voltage at UJT 174 emitter 208. With this voltage reduction, the UJT 174 internal diode is reverse-biased and it ceases to conduct. UJT 162 on the other hand continues in its conducting state until the emitter 210 voltage is reduced to a predetermined level. Therefore, both UJT's 174 and 162 do not conduct for the full start pulse duration. Under these conditions, UJT 162 can be made to conduct for a longer time than would be possible if UJT 174 also were conducting. More energy is applied to the balance wheel as a result of this longer firing time of UJT 162. When UJT 162 ceases to conduct, charging of capacitors 172 and 184 is resumed and the cycle repeats itself.

Figure 6:
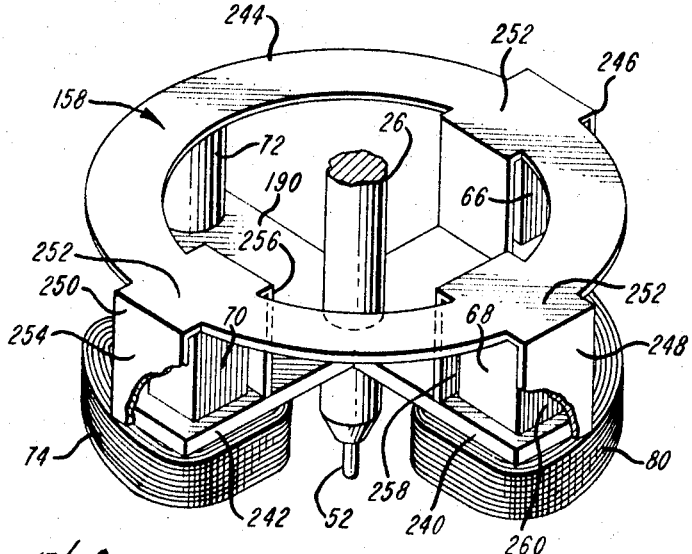
FIGURE 6 is a perspective view with parts broken away showing a further modification of the mechanical assembly particularly suited for use in conjunction with the preferred circuit arrangement of FIGURE 4.

When the first start pulse, as previously described, interacts with the balance wheel 190 of FIGURE 6, some motion is imparted to it. This motion causes the trigger magnets 66 and 68 to move over the windings of the trigger coil 80. This movement induces a signal into the trigger coil 80 and into the input of the amplifier transistor 106. If the initial balance wheel 190 motion is sufficient, the mechanical and electrical system will be immediately synchronized by these induced pulses.

In the arrangement illustrated in FIGURE 4, the natural period of the mechanical oscillating system is preferably slightly less than one half the natural period of control UJT 174 relaxation oscillator, i.e., control oscillator 154. Also, the UJT 174 relaxation oscillator (oscillator 154) period is preferably substantially less than the natural period of UJT 162 relaxation oscillator (start oscillator 152). With these period relationships and the associated circuitry disclosed, it is possible to drive the mechanical oscillator with a large pulse whenever the mechanical motion drops below a certain value, yet not over drive the mechanical system when operating in complete electro-mechanical synchronization.

After the initial start pulse imparts any motion to the mechanical system, the mechanical energy will begin to decrease in accordance with the forces acting on the system, such as mechanical drag resistances, electrical IR losses, magnetic hysteresis and eddy current losses, and windage drag on the balance wheel. Thus, the successive pulses induced in the trigger coil 80 and the corresponding signal at the base 206 of UJT 174 will decrease with the decreasing mechanical motion. However, in accordance with UJT control theory, with the emitter 208 voltage of UJT 174 rising (capacitors 172 and 184 charging during this time), the negative pulse amplitude requirement for UJT 174 control at base 206 decreases. Since the base 206 trigger requirements for the system normally decrease at a faster rate than the decrease of the signal amplitude induced in the trigger coil due to the abovementioned losses, the signal produced at the end of the second oscillation of the balance wheel 190 is sufficient to trigger UJT 174 even though that occurring at the end of the first oscillation may not be sufficiently large to do so. With triggering occurring at twice the period of the mechanical oscillator (UJT 174 firing once for every two oscillations of the mechanical system), the currents produced when UJT 174 fires on the second oscillation are sufficient to fire UJT 162 as previously described for the initial start pulse. With the firing of UJT 162, the full supply voltage is again applied to the drive coil 74. This pulse, however, is now substantially synchronized (even though full mechanical amplitude has not been reached) with the mechanical system, and occurs at the ideal time to transmit maximum energy to the balance wheel because of the isochronous nature of the balance system. This second or synchronized start pulse imparts a larger motion to the balance wheel 190. This greater motion in turn induces a greater signal into the trigger coil 80, increasing the possibility for complete synchronization of the electrical and mechanical system. If full synchronization does not occur, the process repeats itself until complete synchronization does occur.

The immediately preceding paragraph describes the situation during initial start-up or when for some reason full synchronization is lost. It shows how the circuit of FIGURE 4 automatically operates, such that if the induced trigger pulse on trigger coil 80 is insufficient to fire UJT 174 at the end of the first oscillation of the mechanical system, then it is sufficient to fire it at the end of the second period. Furthermore, firing of UJT 174 at the end of the second oscillation provides enough time for the capacitors 172 and 184 to charge sufficiently such that the second-cycle firing of UJT 174 also fires UJT 162, supplying an increased pulse to the drive coil 74.

It should be understood that this increased pulse is applied to the drive coil 74 until such time as the mechanical system is brought up to amplitude so that complete synchronization is achieved. Complete synchronization is characterized by the fact that the mechanical system induces a signal in trigger coil 80 of sufficient amplitude to fire UJT 174 to drive the balance wheel 190 on every cycle of mechanical oscillation. That is, during full synchronization UJT 174 fires after one mechanical cycle rather than after two, at which time the capacitors 172 and 184 have not charged sufficiently to trigger UJT 162. The result is that transistor switch 186 is not energized during full synchronization and the mechanical oscillator is driven by the smaller pulses resulting from the closure of only transistor switch 188 and not also transistor switch 186. UJT 162 cannot be fired by the negative pulse induced at base 210 occurring at the mechanical-system frequency, because of its longer natural period as compared with UJT 174. The purpose of diode 232 is to help discharge capacitor 172 and insure non-firing of UJT 162 during synchronized operation.

Figure 5:
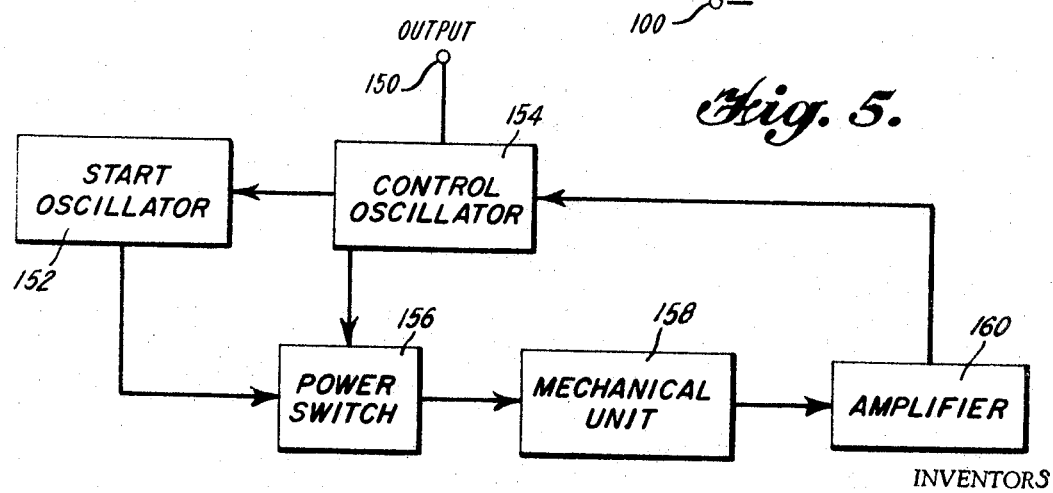
FIGURE 5 is a simplified block diagram of the electrical circuit of FIGURE 4.

While the preferred electrical arrangement of FIGURES 4 and 5 may make use of a mechanical structure according to either FIGURE 2 or FIGURE 3, it is preferred that the mechanical oscillator portion of the unit used in conjunction with the automatic switching arrangement of FIGURE 4 be of the type illustrated in FIGURE 6. A significant feature of the mechanical construction of the pulse generator of the present invention resides in the fact that several permanent magnets are embedded in the oscillating part of the system. Ordinarily, any magnetized material on the mechanical oscillator will interact with the earth's magnetic field, any other magnetic field, or any magnetic material in the vicinity of the oscillating magnetized material. Such magnetic interaction normally seriously affects the timing accuracy of any mechanical oscillator. Any change in mechanical motion or system position alters the magnetic interaction causing external forces to act on the mechanical system. These adverse effects are substantially minimized in the system of the present invention wherein the magnets are all perpendicular to the plane of oscillation of the balance wheel and in some embodiments are provided with keeper and shielding arrangement, for example, the keeper 88 as illustrated in FIGURE 3.

In the preferred embodiment of FIGURE 6, the magnets 66, 68 and 70 are mounted on a pair of perpendicular cross arms 240 and 242 forming the balance wheel 190, both of which are rigidly secured for rotation with the balance staff 26. These cross arms are suitably apertured at their ends such that the magnets pass completely through the cross arms so as to either lie flush with or project slightly from the underside of the balance wheel. At the same time, a novel magnetic shielding arrangement is utilized in FIGURE 6, whereby the magnets are joined by an annular keeper or shunt in the form of a planar ring 244 having enlarged, substantially U-shaped portions defining a plurality of magnetic shielding housings 246, 248 and 250. Each housing comprises a flat top at 252 formed integral with the ring 244 but of slightly greater width and a pair of spaced sides 254 and 256, both of which are preferably rigidly secured to the respective cross arm 240 or 242 of the balance wheel 190. Thus the shielding housings not only provide a shielding along two sides of each of the magnets, but also act as a rigid support for the keeper ring 244. The upper ends of the magnets are preferably in tight contact with the enlarged portions of the keeper ring, or at the most only slightly spaced therefrom. The housings 246, 248 and 252, which act to magnetically shield the magnets so as to minimize stray fields emanating from the magnets, are preferably closed only on two sides and the legs 254 and 256 are preferably spaced from the magnets to provide slots on each side so as to minimize windage problems as the balance assembly rotates. These spaces are indicated at 258 and 260 for the magnet 68 in FIGURE 6. The drive and trigger coils are supported in the manner illustrated in FIGURES 2 and 3, directly beneath the oscillating balance wheel 190 so as to appropriately interact with the magnetic field of the permanent magnets in the manner previously described.

It is apparent from the above that the present invention provides a novel pulse generator adapted to produce low frequency pulses, i.e., having a repetition rate in the neighborhood of from 1 to 20 cycles per second, with very extreme accuracy. In each case, the device makes use of a three-terminal, negative-resistance, solid-state device, preferably in the form of the well-known unijunction transistor. This solid-state device has the important characteristic that it may be triggered or fired from either one of two terminals—namely, either the emitter terminal or the Base 2 terminal. At the same time, firing acts to discharge a timing capacitor coupled to the transistor emitter and causes current to flow both through the double-base circuit and through the emitter-Base circuit. The triggering or firing of the three-terminal solid-state device is accompanied by the actuation of a solid-state electronic switch preferably in the form of a switching transistor. In this way, the circuit acts to provide accurate pulse outputs wherein substantially all of the power supply energy may be applied to the drive coil for actuating the magnetic oscillator portion of the circuit. It is understood that other solid-state switching devices may be substituted for the transistors, such as, for example, a silicon-controlled rectifier or the like.

In the preferred embodiment illustrated in FIGURE 4, there is disclosed a novel automatic-switching arrangement which provides for much more rapid start-up, substantially increases the life of a small power supply such as a battery or the like, and provides a unit which produces a much more accurate low frequency output. This is made possible in the circuit of FIGURE 4 by providing an automatic internal switching arrangement wherein extra power is supplied to the trigger coil only when the mechanical system falls out of complete synchronization by more than a predetermined amount. This lack of full synchronization is, of course, most pronounced during start-up, but may occur at any time due to various external forces which may act on the mechanical system, including temperature and other environmental changes, as well as accelerations and the like to which the device may be subjected. The circuit parameters are selected such that the natural frequency of the mechanical system, as determined by the well-known hairspring and balance wheel relationships, is such that the mechanical system has a period slightly less than one half of the electronic control oscillator 154. At the same time, the period of the electronic control oscillator 154 is chosen to be at least slightly less than the period of the electronic start oscillator 152 of FIGURES 4 and 5. When the departure from full synchronization exceeds a predetermined amount, as determined by the failure of the control oscillator to fire on every cycle of the mechanical oscillator, the circuit automatically acts to switch in the start oscillator 152 on the next mechanical cycle to provide an increased "kick" to the mechanical unit.

Although the unit has been shown and specifically described as a pulse generator, it is readily apparent that it can be used as the drive unit for an electric timepiece in a conventional manner where it provides an automatic start-up system for inducing initial oscillations and for automatically correcting any excessive variation in the timepiece balance system.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A timing device comprising a mechanical oscillator, first and second self starting electrical oscillatory systems coupled to said mechanical oscillator for driving said mechanical oscillator, and means coupled to said mechanical oscillator and to said oscillatory systems for selectively rendering said second electrical system inoperative to drive said mechanical oscillator.

2. A timing device according to claim 1 wherein said selective means is responsive to a predetermined change in the amplitude of oscillation of said oscillator.

3. A timing device comprising a mechanical oscillatory system, first and second self starting electrical oscillatory systems coupled to said mechanical oscillatory system for driving said mechanical oscillatory system, each of said electrical oscillatory systems having a natural period more than twice the period of said mechanical system.

4. A timing device comprising a mechanical oscillator, first and second self starting relaxation oscillators for driving said mechanical oscillator, said relaxation oscillators each having a natural period of oscillation more than twice said mechanical oscillator, and means coupled to said oscillators for selectively coupling one or both of said relaxation oscillators to said mechanical oscillator to drive said mechanical oscillator in response to the amplitude of oscillation of said mechanical oscillator.

5. A timing device according to claim 1 wherein said coupling means comprises a switch responsive to said amplitude of oscillation.

6. A timing device according to claim 4 wherein one of said relaxation oscillators has a longer natural oscillation period than the other.

7. A timing device according to claim 4 wherein said mechanical oscillator includes drive and pickup coils coupled to said relaxation oscillators, the signal from said pickup coil firing one or both of said relaxation oscillators depending upon its magnitude.

8. A timing device comprising a mechanical oscillator having drive and pickup coils, a pair of self starting relaxation oscillators coupled to said drive and pickup coils, said relaxation oscillators each having a natural period more than twice the period of said mechanical oscillator, and the period of one of said relaxation oscillators being greater than the other, whereby a signal from said pickup coil above a predetermined value fires only said other relaxation oscillator while a lower signal fires both said relaxation oscillators every other cycle of said mechanical oscillator.

9. A timing device according to claim 8 wherein both said relaxation oscillators are unijunction transistor oscillators.

10. A timing device according to claim 8 wherein said relaxation oscillators are coupled together and have capacitors with different charging rates, whereby firing of said other oscillator triggers said first oscillator to fire only after a charging time greater than the period of said mechanical oscillator.

11. A timing device comprising an impedance having first, second and third terminals, said device being rendered conductive by signals applied to either of said first or second terminals whereby current flows between said first and third terminals and said second and third terminals, first means for supplying a periodic signal to said first terminal to cause periodic conduction through said impedance at a first repetition rate and second means for supplying a periodic signal to said second terminal of said impedance to cause periodic conduction through said impedance at a second rate greater than said first rate, said second means including a pair of power supply terminals, a mechanical time-delay assembly having input and output impedances, a solid-state switch coupled in series with said input impedance between said power supply terminals, means coupling said switch to said third terminal of said three-terminal impedance whereby said switch is rendered operative in response to current flow through said third terminal, means coupling said output impedance to said second terminal of said three-terminal impedance, said mechanical time-delay assembly comprising a balance wheel, a drive magnet and a pair of trigger magnets mounted on said balance wheel, and magnetic shielding means around said magnets, said input and output impedance comprising drive and trigger coils cooperating with said magnets to sustain oscillation of said balance wheel.

12. A timing device comprising a balance wheel, drive and trigger magnets carried by said balance wheel, a drive coil adjacent said balance wheel cooperating with said drive magnet to impulse said balance wheel, a trigger coil adjacent said balance wheel cooperating with said trigger magnet to derive a periodic trigger impulse from said balance wheel, a control oscillator coupled between said trigger and drive coils for driving said balance wheel, and a start oscillator coupled between said trigger and drive coils for supplying increased energy to said drive coil when the oscillation amplitude of said balance wheel is below a predetermined amount.

13. A device according to claim 12 wherein the natural period of said control oscillator is greater than twice the oscillatory period of said balance wheel, and the natural period of said start oscillator is greater than the natural period of said control oscillator.

14. A timing device comprising a balance wheel, drive and trigger magnets carried by said balance wheel, a drive coil adjacent said balance wheel cooperating with said drive magnet to impulse said balance wheel, a trigger coil adjacent said balance wheel cooperating with said trigger magnet to derive a periodic trigger impulse from said balance wheel, a unijunction control oscillator having its base circuit coupled to said drive coil whereby said control oscillator supplies drive energy to said balance wheel, means coupling said trigger coil to the base two electrode of said control oscillator for firing said control oscillator in synchronism with said balance wheel, a unijunction start oscillator having its base circuit coupled to said drive coil whereby said start oscillator supplies start energy to said balance wheel, means coupling said trigger coil to the base two electrode of said start oscillator for firing said start oscillator in synchronism with said balance wheel to supply increased energy to said balance wheel, and means including a capacitor common to the emitter circuits of both said oscillators for firing said start oscillator only when the amplitude of said balance wheel is below a predetermined amount.

15. A timing device according to claim 14 wherein said start oscillator has a natural period greater than that of said control oscillator, said common capacitor discharging through said control oscillator prior to firing of said start oscillator when said balance wheel amplitude is above said predetermined level.

16. A timing device according to claim 15 wherein said control oscillator fires on every cycle of said balance wheel when its amplitude is above said predetermined level, and fires on every other cycle when said balance wheel amplitude is below said predetermined level.

17. A timing device according to claim 14 wherein said magnets are each encased in a magnetic shield, and annular keeper means parallel to said balance wheel and engaging said shields.

References Cited

UNITED STATES PATENTS

| | | | |
|---|---|---|---|
| 3,095,528 | 6/1963 | Döme | 310—36 XR |
| 3,124,731 | 3/1964 | Eysen et al. | 318—132 |
| 3,134,220 | 5/1964 | Meisner | 58—28 |
| 3,152,295 | 10/1964 | Schebler | 318—118 |
| 3,218,793 | 11/1965 | Walton | 318—129 XR |
| 3,299,627 | 1/1967 | Hart et al. | 331—111 XR |
| 3,310,690 | 3/1967 | Reich | 318—132 XR |

MILTON O. HIRSHFIELD, *Primary Examiner.*

D. F. DUGGAN, *Assistant Examiner.*

U.S. Cl. X.R.

58—23; 310—36; 318—132; 331—116, 145

PO-1050
(5/69)

UNITED STATES PATENT OFFICE
CERTIFICATE OF CORRECTION

Patent No. 3,447,052    Dated May 27, 1969

Inventor(s) Vincent W. Martin

It is certified that error appears in the above-identified patent and that said Letters Patent are hereby corrected as shown below:

Column 7, line 57, "intaroducing" should read -- introducing --. Column 7, line 63, after "unit" insert -- . --; Column 10, line 13, "IR" should read -- $I^R$ --. Column 10, line 20, after "rising" insert -- , --. Column 13, line 14, "1" should read -- 4 --.

SIGNED AND
SEALED
FEB 3 1970

(SEAL)
Attest:

Edward M. Fletcher, Jr.
Attesting Officer

WILLIAM E. SCHUYLER, JR.
Commissioner of Patents